United States Patent
Kim

(10) Patent No.: US 9,229,555 B2
(45) Date of Patent: Jan. 5, 2016

(54) TOUCH SCREEN PANEL AND METHOD OF MANUFACTURING THE SAME

(71) Applicant: Samsung Display Co., Ltd., Yongin, Gyeonggi-Do (KR)

(72) Inventor: Kyu-Young Kim, Yongin (KR)

(73) Assignee: Samsung Display Co., Ltd., Gyeonggi-Do (KR)

( * ) Notice: Subject to any disclaimer, the term of this patent is extended or adjusted under 35 U.S.C. 154(b) by 228 days.

(21) Appl. No.: 13/772,124

(22) Filed: Feb. 20, 2013

(65) Prior Publication Data
US 2014/0118292 A1    May 1, 2014

(30) Foreign Application Priority Data
Nov. 1, 2012   (KR) ................. 10-2012-0122877

(51) Int. Cl.
G06F 3/044    (2006.01)
G06F 3/041    (2006.01)

(52) U.S. Cl.
CPC .............. *G06F 3/041* (2013.01); *G06F 3/044* (2013.01); *G06F 2203/04103* (2013.01); *G06F 2203/04111* (2013.01)

(58) Field of Classification Search
CPC .................................. G06F 3/044; G06F 3/041
USPC ..................... 345/156–179; 178/18.01–19.06
See application file for complete search history.

(56) References Cited

U.S. PATENT DOCUMENTS

| | | | |
|---|---|---|---|
| 8,049,333 B2 | 11/2011 | Alden et al. | |
| 2009/0176325 A1 | 7/2009 | Jeon et al. | |
| 2009/0262096 A1* | 10/2009 | Teramoto | 345/174 |
| 2011/0035938 A1* | 2/2011 | Kweon et al. | 29/830 |
| 2011/0205168 A1* | 8/2011 | Jun | 345/173 |
| 2011/0207055 A1* | 8/2011 | Jun et al. | 430/313 |
| 2011/0279401 A1 | 11/2011 | Hong et al. | |
| 2012/0013554 A1* | 1/2012 | Nam et al. | 345/173 |
| 2012/0092292 A1* | 4/2012 | Hayakawa | 345/174 |
| 2012/0229414 A1* | 9/2012 | Ellis | 345/174 |
| 2013/0033446 A1* | 2/2013 | Liu | 345/173 |
| 2013/0057497 A1* | 3/2013 | Cho et al. | 345/173 |
| 2013/0201116 A1* | 8/2013 | Huang | 345/173 |
| 2013/0293508 A1* | 11/2013 | Lin et al. | 345/174 |

FOREIGN PATENT DOCUMENTS

| | | |
|---|---|---|
| KR | 10-2008-0066658 (A) | 7/2008 |
| KR | 10-2009-0074925 (A) | 7/2009 |
| KR | 10-2011-0125970 (A) | 11/2011 |
| KR | 10-2012-0059664 (A) | 6/2012 |

\* cited by examiner

*Primary Examiner* — Priyank Shah
(74) *Attorney, Agent, or Firm* — Knobbe Martens Olson & Bear LLP

(57) ABSTRACT

In one aspect, a touch screen panel and a method of manufacturing the same are provided. In some embodiments, the touch screen panel includes a substrate including a sensing region and a peripheral region, a plurality of first sensing patterns, a plurality of second sensing patterns, and an insulating layer, where the insulating layer is patterned so that both sides of the second sensing patterns are exposed.

12 Claims, 4 Drawing Sheets

TOUCH SCREEN PANEL AND METHOD OF MANUFACTURING THE SAME

CROSS-REFERENCE TO RELATED APPLICATION

This application claims priority to and the benefit of Korean Patent Application No. 10-2012-0122877, filed on Nov. 1, 2012 in the Korean Intellectual Property Office, the disclosure of which is incorporated herein by reference in its entirety.

BACKGROUND

1. Field

The described technology generally relates to a touch screen panel and a method of manufacturing the same, and more particularly, to a touch screen panel capable of reducing masks and manufacturing processes and a method of manufacturing the same.

2. Description of the Related Technology

A liquid crystal display (LCD) or an organic light emitting display (OLED) may include a touch screen panel. The touch screen panel may allow an object such as a user's hand or a pen to input a command by sensing capacitance between two electrodes or by detecting a voltage change at a contact position and to provide a command of the position to a display device.

Recently, a display device using a flexible substrate formed of glass, plastic, and metal has been of interest. Since the flexible substrate may be light and bendable, the flexible substrate may be appropriate to include in a display device of a portable personal terminal or a large display device.

Accordingly, the touch screen panel must be flexible when the display device is flexible.

In general, the sensing electrodes of the touch screen panel are formed of a transparent electrode material such as indium tin oxide (ITO). However, a crack may be generated when ITO is bent, and it is difficult to apply ITO to the flexible touch screen panel. Therefore, other materials such as Ag nanowires, metal mesh, graphene, and conductive polymer are suggested as electrode materials. However, it is difficult to apply the above materials to real products.

In addition, conventional touch screen panels are made by complicated manufacturing processes that require a large number of masks.

SUMMARY

Some embodiments provide a touch screen panel capable of using Ag having low surface resistance or Ag nanowires having low surface resistance and high flexibility as an electrode material.

Some embodiments provide a method of manufacturing a touch screen panel capable of reducing the number of masks and manufacturing processes.

Some embodiments provide a touch screen panel, including a substrate including a sensing region and a peripheral region around the sensing region, a plurality of first sensing patterns provided in the sensing region of the substrate and connected to each other in a direction by a connecting unit, a plurality of second sensing patterns arranged to be separated from each other in a direction that intersects the first sensing patterns, an insulating layer formed on the first sensing patterns, the connecting unit, and the second sensing patterns, where the insulating layer is patterned so that both sides of the second sensing patterns are exposed, at least one bridge is provided on the insulating layer to intersect the connecting unit, for connecting the exposed parts of the second sensing patterns, and a plurality of wiring lines provided in the peripheral region of the substrate and connected to the first sensing patterns and the second sensing patterns.

Some embodiments provide a method of manufacturing a touch screen panel, including forming a metal layer and an insulating layer on a substrate including a sensing region and a peripheral region, patterning the insulating layer using a first mask, patterning the metal layer by an etching process using the insulating layer as a mask to form a plurality of first sensing patterns connected to each other in a direction by a connecting unit and a plurality of second sensing patterns arranged to be separated from each other in a direction that intersects the first sensing patterns in the sensing region of the substrate, etching parts of the first sensing patterns, the connecting unit, and the second sensing patterns under the insulating layer, etching a partial thickness of the insulating layer to expose both sides of the second sensing patterns, forming a conductive layer on an entire top surface, and patterning the conductive layer by a photolithography process using a second mask to form at least one bridge that intersects the connecting unit and that connects exposed parts of the second sensing patterns on the insulating layer.

In some embodiments, the sensing electrodes may be formed of Ag having low surface resistance or Ag nanowires having low surface resistance and high flexibility. When Ag is etched at high speed, Ag may be damaged in a process of patterning a layer thereon. In some embodiments, the insulating layer may be formed on the sensing electrodes so that it is possible to prevent Ag from being damaged.

When the sensing electrodes are formed of Ag nanowires, due to the contact area between the sensing electrodes and the bridge or the wiring line being small, contact resistance may be increased. However, in an aspect embodiment of the present embodiments, a plurality of bridges may be formed to increase the contact area so that the contact resistance is not increased.

In some embodiments, the touch screen panel may be manufactured using two masks. In a conventional manufacturing method, the sensing electrodes, the insulating layer, the bridge, and the wiring lines are formed using respective masks. However, in as aspect of the present embodiments, since the touch screen panel may be manufactured using only two masks, it is possible to effectively reduce the time required for the manufacturing processes and manufacturing cost.

BRIEF DESCRIPTION OF THE DRAWINGS

The accompanying drawings, together with the specification, illustrate exemplary embodiments of the present embodiments, and, together with the description, serve to explain the principles of the present embodiments.

DETAILED DESCRIPTION

Figure 1:
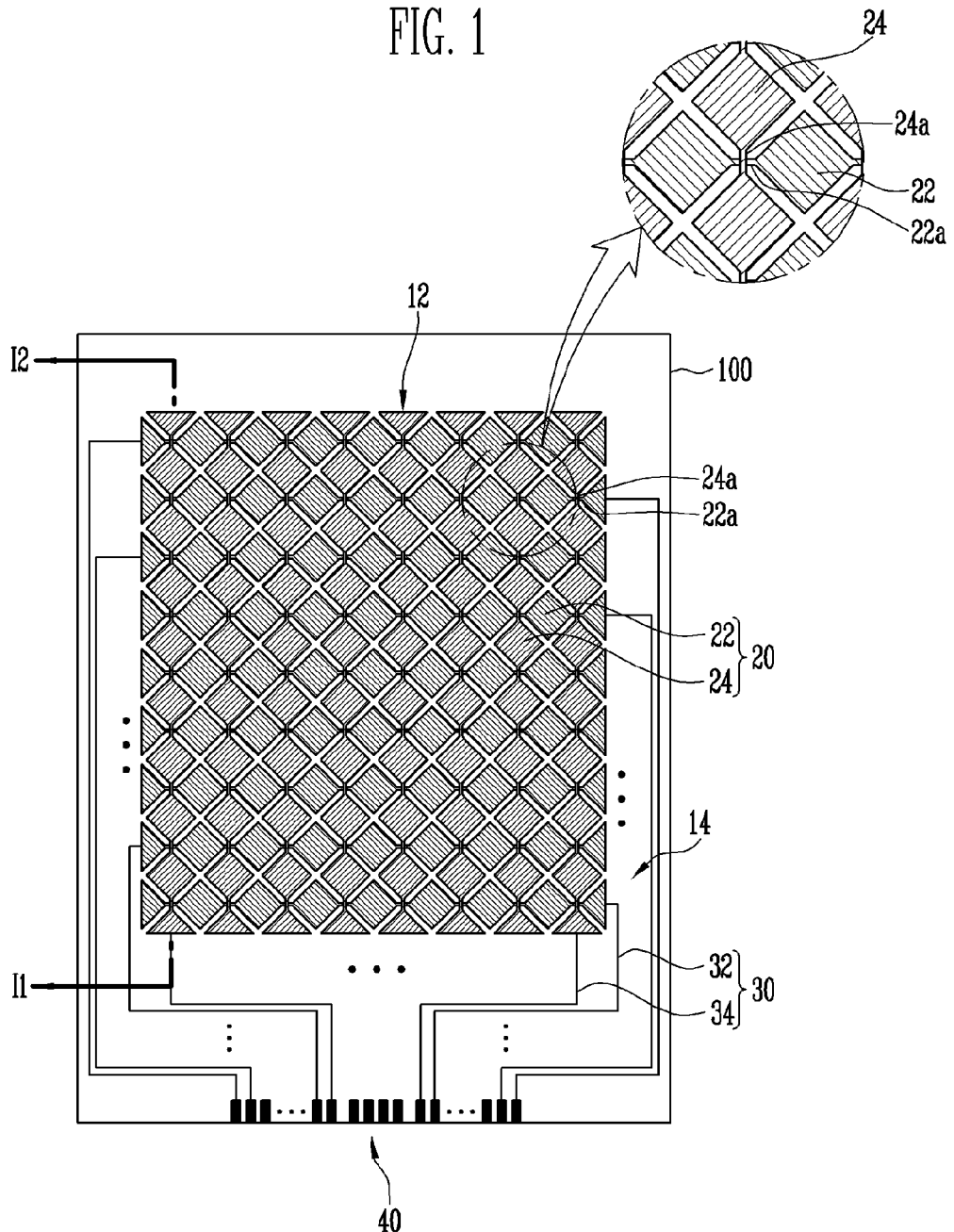
FIG. 1 is a schematic planar view illustrating a touch screen panel according to an embodiment.

In the following detailed description, only certain exemplary embodiments of the present disclosure have been shown and described, simply by way of illustration. It is to be understood, the described embodiments may be modified in various different ways, all without departing from the spirit or scope of the present disclosure. Accordingly, the drawings and description are to be regarded as illustrative in nature and not restrictive. In addition, when an element is referred to as being "on" another element, it can be directly on the described element or be indirectly on the described element with one or more intervening elements interposed therebetween. Also, when an element is referred to as being "connected to" another element, it can be directly connected to the described element or be indirectly connected to the described element with one or more intervening elements interposed therebetween. Hereinafter, like reference numerals refer to like elements.

Hereinafter, embodiments of the present disclosure will be described in detail with reference to the accompanying drawings. The embodiments are provided for illustrative purposes and various changes in form and details may be made therein. The scope of the present invention is not limited to the embodiments set forth herein.

FIG. 1 is a schematic plan view illustrating a touch screen panel according to an embodiment.

Referring to FIG. 1, a substrate 100 includes a sensing region 12 and a peripheral region 14. The substrate 100 is formed of a transparent insulating material such as thin film shaped glass or plastic and may be a flexible substrate.

In some embodiments, the sensing region 12 for sensing a contact position of a hand or an object may be provided, for example, in the center of the substrate 100. A plurality of sensing electrodes 20 are formed on the substrate 100 of the sensing region 12. The plurality of sensing electrodes 20 include a plurality of first sensing patterns 22 arranged to be connected to each other in one direction (for example, an X direction) and a plurality of second sensing patterns 24 arranged to be connected to each other in the direction (for example, a Y direction) that intersects the first sensing patterns 22. In some embodiments, the first sensing patterns 22 and the second sensing patterns 24 may be formed of a transparent conductive material.

In some embodiments, the first sensing patterns 22 or the second sensing patterns 24 may be formed to be separated from each other in an independent pattern and may be connected to each other by a bridge. For example, when the first sensing patterns 22 are connected to each other by a connecting unit 22a, the second sensing patterns 24 are formed to be separated from each other and are connected to each other by a bridge 24a. In some embodiments, the bridge 24a is provided to intersect the connecting unit 22a of the first sensing patterns 22 and may be electrically insulated from the connecting unit 22a of the first sensing patterns 22 by an insulating layer (not shown).

In some embodiments, the insulating layer may be formed on the first sensing patterns 22, the connecting unit 22a, and the second sensing patterns 24 and may be patterned so that both sides of the second sensing patterns 24 are exposed. In some embodiments, the bridge 24a may be provided on the insulating layer to intersect the connecting unit 22a to connect the exposed parts of adjacent second sensing patterns 24 to each other.

In some embodiments, the insulating layer may be formed to be larger than the first sensing patterns 22, the connecting unit 22a, and the second sensing patterns 24 or the insulating layer on the second sensing patterns 24 and the insulating layer on the connecting unit 22a are connected to each other and a plurality of slots or holes (not shown) may be formed in the insulating layer between the second sensing patterns 24 and the connecting unit 22a so that the bridge 24a is not electrically connected to the first sensing patterns 22 and the connecting unit 22a.

In some embodiments, the peripheral region 14 is a peripheral part of the sensing region 12. A plurality of wiring lines 30 connected to a plurality of sensing electrodes 20 and a pad unit 40 connected to the plurality of wiring lines 30 are formed on the substrate 100 of the peripheral region 14. For example, a wiring line 32 may be formed to be connected to the plurality of first sensing patterns 22 and a wiring line 34 may be formed to be connected to the plurality of sensing patterns 24. In some embodiments, the wiring line 30 may be formed of a transparent conductive material.

In some embodiments, a driving circuit board (not shown) for driving the touch screen panel may be electrically connected to the pad unit 40.

Figure 2A:
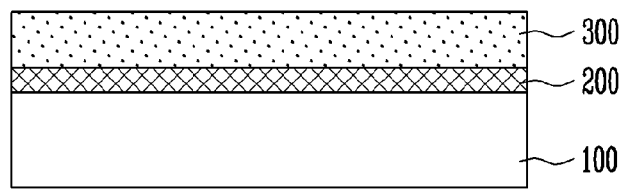
FIGS. 2A to 2E are sectional views illustrating a method of manufacturing a touch screen panel according to an embodiment of the present invention.
Figure 2B:
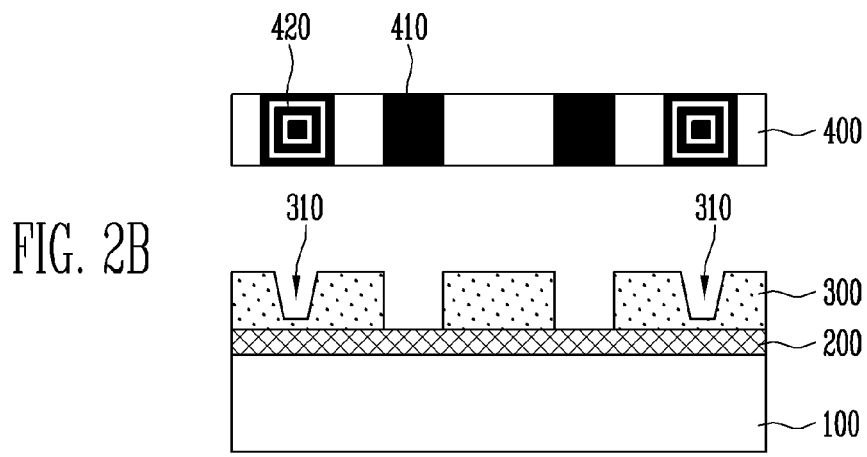

FIGS. 2A and 2B are sectional views illustrating a method of manufacturing a touch screen panel according to an embodiment. FIGS. 3A to 3D are planar views illustrating a method of manufacturing a touch screen panel according to an embodiment. A section taken along the line 11-12 of the sensing region 12 illustrated in FIG. 1 is illustrated.

Figure 3A:
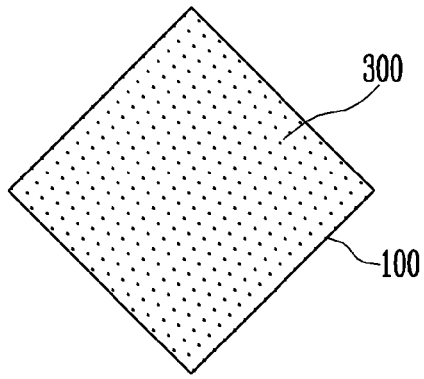
FIGS. 3A to 3D are plan views illustrating a method of manufacturing a touch screen panel according to an embodiment.

Referring to FIGS. 2A and 3A, a metal layer 200 and an insulating layer 300 are sequentially formed on the substrate 100 including the sensing region 12 and the peripheral region 14. In some embodiments, the metal layer 200 may be formed of Ag having low surface resistance and Ag nanowires having low surface resistance and high flexibility. Ag nanowires may be formed by spin coating or slit coating. In some embodiments, the insulating layer 300 may be formed of an organic insulating material and is preferably formed of a negative organic insulating material. In some embodiments, acrylate and epoxy based materials may be used as the organic insulating material.

Figure 3B:
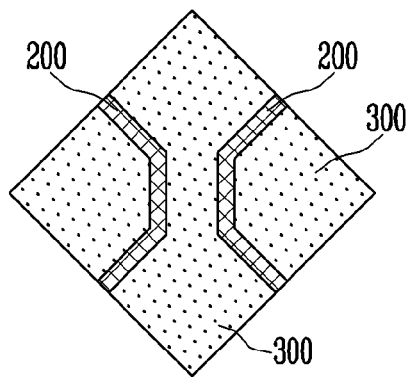

Referring to FIGS. 2B and 3B, the insulating layer 300 is patterned using a first mask 400 for forming the sensing pattern 20. During formation of the sensing pattern 20, the insulating layer 300 in the parts where the sensing electrode 20 is not formed is patterned so that the metal layer 200 is completely exposed and the insulating layer 300 in the parts 310 to which the bridge is to be connected is patterned so that a partial thickness remains.

In order to pattern the insulating layer 300 as described above, light blocking patterns 410 are formed in the first mask 400 corresponding to the parts where the metal layer 200 is completely exposed and semi-transmissive patterns 420 may be formed in the first mask 400 corresponding to the parts 310 where the partial thickness of the insulating layer 300 remains. In some embodiments, semi-transmissive patterns 420 may be formed of slit patterns or half tone patterns. In some embodiments, the distance between the slit patterns or the halftone patterns and the amount of exposure of the slit patterns or the halftone patterns are controlled so that the remaining thickness of the insulating layer 300 may be controlled.

Figure 2C:
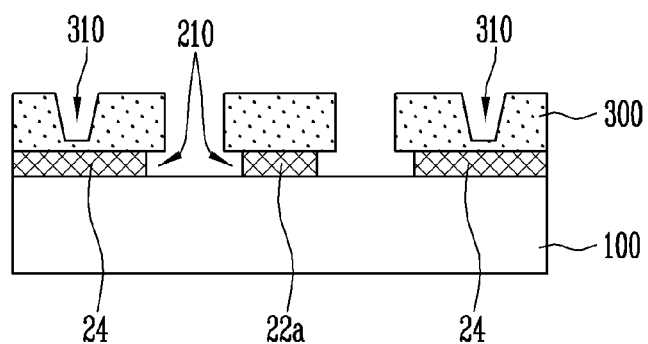

Referring to FIG. 2C, the metal layer 200 (shown in FIG. 2B) is patterned by a wet etching process using the patterned insulating layer 300 as a mask to form the first sensing patterns 22 (shown in FIG. 1), the connecting unit 22a, and the second sensing patterns 24. During the wet etching process, the sides of the first sensing patterns 22, the connecting unit 22a, and the second sensing patterns 24 under the insulating layer 300 are excessively etched so that undercuts 210 are generated in both parts under the insulating layer 300. For example, when Al (aluminum) etchant is used, since the etching ratio of Ag is larger than that of the organic insulating layer, the undercuts 210 may be formed.

In some embodiments, the plurality of first sensing patterns 22 (shown in FIG. 1) are connected to each other in one direction (for example, the X direction) by the connecting unit 22a and the plurality of second sensing patterns 24 are arranged to be separated from each other in the direction (for example, the Y direction) that intersects the first sensing patterns 22 (shown in FIG. 1).

Although not shown, in some embodiments, the wiring line 32 connected to the plurality of first sensing patterns 22 and the wiring line 34 connected to the plurality of second sensing patterns 24 may be formed in the peripheral region 14 of the substrate 100 when the metal layer 200 is patterned.

Figure 2D:
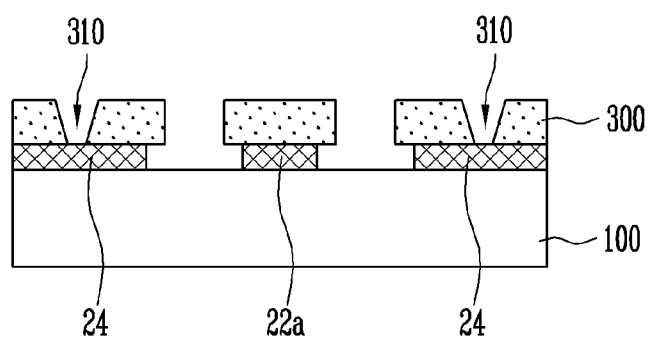
Figure 3C:
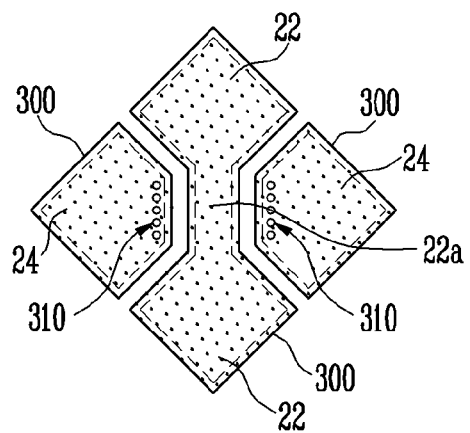

Referring to FIGS. 2D and 3C, the partial thickness of the insulating layer 300 may be entirely etched by a dry etching process to expose the sensing electrode 20 of the parts 310 to which the bridge is to be connected, for example, parts of the second sensing patterns 24.

Figure 2E:
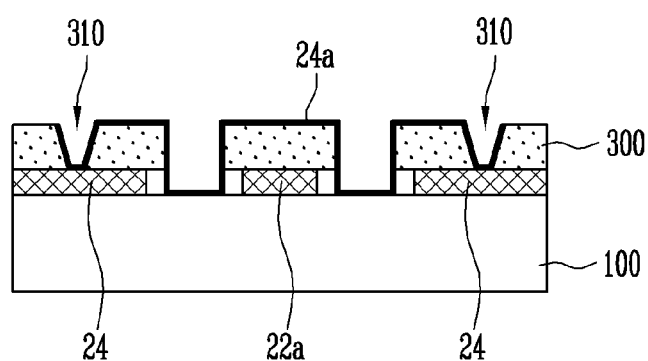
Figure 3D:
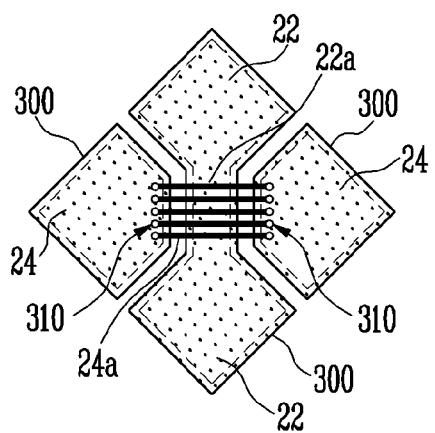

Referring to FIGS. 2E and 3D, after a conductive layer is formed on the entire top surface to a uniform thickness, the conductive layer may be patterned by a photolithography process using a second mask for forming the bridge to form, for example, the bridge 24a for connecting the second sensing patterns 24 to each other. During patterning, the bridge 24a may be not electrically connected to the connecting unit 22a thereunder due to the undercuts 210 (shown in FIG. 2C). In some embodiments, the conductive layer may be formed of low resistance metal such as Mo, Ag, Ti, Al, and Cu, a lamination structure of the above metals, or a transparent conductive material such as ITO.

In some embodiments, when the conductive layer is formed and patterned in the state where the sensing electrode 20 formed of the metal layer 200 or the wiring line 30 is exposed, the sensing electrode 20 or the wiring line 30 may be damaged where a difference in the etching ratio between the metal layer 200 and the conductive layer is small. However, in some embodiments, the insulating layer 300 may be formed on the sensing electrode 20 and the wiring line 30 so that the sensing electrode 20 or the wiring line 30 is not damaged when the difference in the etching ratio between the metal layer 200 and the conductive layer is small.

Although not shown, the wiring line 32 connected to the plurality of first sensing patterns 22 and the wiring line 34 connected to the plurality of second sensing patterns 24 may be formed in the peripheral region 14 of the substrate 100 when the conductive layer is patterned.

When the second sensing patterns 24 are formed of Ag nanowires, since a contact area between the second sensing patterns 24 and the bridge 24a is small, contact resistance may be increased. Therefore, in consideration of the entire resistance value of the second sensing patterns 24, if necessary, a plurality of bridges 24a may be formed. In some embodiments, the width of the bridges 24a is preferably 1 μm to 6 μm and the distance between the bridges 24a is preferably no more than 5 μm in consideration of visibility.

Figure 4A:
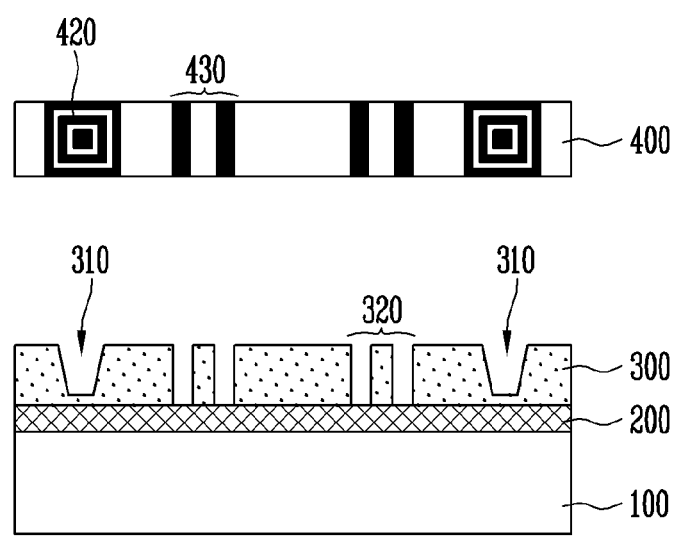
FIGS. 4A and 4B are sectional views illustrating a method of manufacturing a touch screen panel according to another embodiment.
Figure 4B:
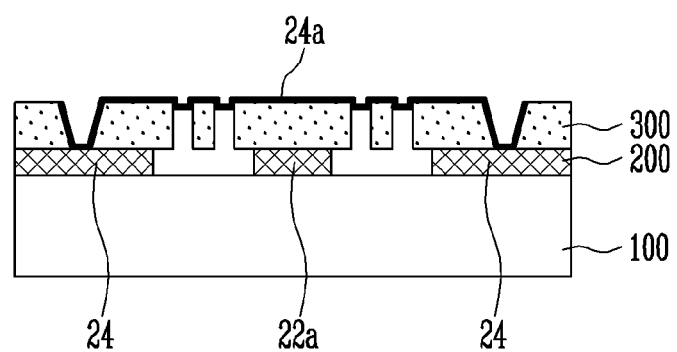

FIGS. 4A and 4B are sectional views illustrating a method of manufacturing a touch screen panel according to another embodiment of the present invention.

First, as illustrated in FIG. 2A, the metal layer 200 and the insulating layer 300 are sequentially formed on the substrate 100 including the sensing region 12 and the peripheral region 14. As illustrated in FIG. 2B, the insulating layer 300 is patterned using the first mask 400 for forming the sensing electrode 20.

Referring to FIG. 4A, during patterning, a plurality of slits or holes 320 are formed in the insulating layer 300 in the parts where the sensing electrode 20 is not formed. In order to pattern the insulating layer 300, slit or hole shaped light blocking patterns 430 may be formed in the first mask 400 corresponding to the plurality of slits or holes 320.

Then, the metal layer 200 is etched as illustrated in FIG. 2C and the insulating layer 300 is etched as illustrated in FIG. 2D.

In some embodiments, the conductive layer may be formed on the entire top surface to a uniform thickness as illustrated in FIG. 2E. In some embodiments, the conductive layer may be patterned by the photolithography process using the second mask for forming the bridge to form, for example, the bridge 24a for connecting the second sensing patterns 24.

In some embodiments, the distance between the plurality of slits or holes 320 is small. In some embodiments, the conductive layer may be formed on only the surface without being filled in the plurality of slits or holes 320 since the distance between the plurality of slits or holes 320 is small. In some embodiments, the bridge 24a may be formed on only the surface of the insulating layer 300. In some embodiments, the bridge 24a is not electrically connected to the connecting unit 22a thereunder since the bridge 24a may be formed on only the surface of the insulating layer 300.

While the present embodiments have been described in connection with certain exemplary embodiments, it is to be understood that the present embodiments are not limited to the disclosed embodiments and are intended to cover various modifications and equivalent arrangements included within the spirit and scope of the appended claims, and equivalents thereof.

What is claimed is:

1. A touch screen panel, comprising:
    a substrate including a sensing region and a peripheral region around the sensing region;
    a plurality of first sensing patterns provided in the sensing region of the substrate and connected to each other in a direction by a connecting unit;
    a plurality of second sensing patterns arranged to be separated from each other in a direction that intersects the first sensing patterns when viewed in a direction normal to the surface of the sensing region, wherein the first sensing patterns, the connecting unit, and the second sensing patterns are formed of silver ("Ag") or Ag nanowires;
    an insulating layer formed of an organic insulating material and formed on the first sensing patterns, the connecting unit, and the second sensing patterns, wherein the insulating layer is patterned so that a part of each top surface of the second sensing patterns is exposed, and wherein each exposed top surface is surrounded by the insulating layer;
    at least one bridge provided on the insulating layer connecting exposed parts of two adjacent second sensing patterns, wherein the at least one bridge intersects the connecting unit when viewed in the direction normal to the surface of the sensing region; and
    wherein the first sensing patterns, the connecting unit, and the second sensing patterns each include an undercut beneath the insulating layer, and wherein the at least one bridge is formed over the undercuts on each of the connecting unit and the second sensing patterns.

2. The touch screen panel of claim 1, wherein the substrate is a flexible substrate.

3. The touch screen panel of claim 1,
    wherein the insulating layer on the second sensing patterns and the insulating layer on the connecting unit are connected to each other, and
    wherein a plurality of slots or holes are formed in the insulating layer between the second sensing patterns and the connecting unit.

4. The touch screen panel of claim 1, further comprising a plurality of wiring lines provided in the peripheral region of the substrate and connected to the first sensing patterns and the second sensing patterns.

5. A method of manufacturing a touch screen panel, comprising:
- forming a metal layer and an organic insulating layer on a substrate including a sensing region and a peripheral region, wherein the metal layer comprises silver ("Ag") or Ag nanowires;
- patterning the organic insulating layer using a first mask;
- patterning the metal layer by an etching process using the organic insulating layer as a mask to form a plurality of first sensing patterns connected to each other by a connecting unit and a plurality of second sensing patterns arranged to be separated from each other in a direction that intersects the first sensing patterns when viewed in a direction normal to the surface of the sensing region;
- etching parts of the first sensing patterns, the connecting unit, and the second sensing patterns under the organic insulating layer;
- etching parts of the insulating layer to expose a part of each top surface of the second sensing patterns, wherein each exposed top surface is surrounded by the organic insulating layer;
- forming a conductive layer on an entire top surface; patterning the conductice layer by a photolithography process using a second mask to form at least one bridge on the organic insulating layer that connects exposed parts of two adjacent second sensing patterns, wherein the at least one bridge intersects the connecting unit when viewed in the direction normal to the surface of the sensing region; and wherein the first sensing patterns, the connecting unit, and the second sensing patterns each include an undercut beneath the organic insulating layer, and wherein the at least one bridge is formed over the undercuts on each of the connecting unit and the second sensing patterns.

6. The method of claim 5, wherein the substrate is a flexible substrate.

7. The method of claim 5, wherein the organic insulating layer is formed of an organic material.

8. The method of claim 5, wherein patterning the organic insulating layer exposes the metal layer in regions where the first sensing patterns, the connecting unit, and
  - the second sensing patterns are not formed and a portion of the organic insulating layer is removed to provide a partial thickness of the organic insulating layer in parts of the second sensing patterns to which the bridge is to be connected.

9. The method of claim 5, wherein patterning the organic insulating layer exposes a plurality of slits or holes in regions where the first sensing patterns, the connecting unit, and the second sensing patterns are not formed so that the metal layer is exposed and a portion of the organic insulating layer is removed to provide a partial thickness of the organic insulating layer in parts to which the bridge is to be connected on the second sensing patterns.

10. The method of claim 5, wherein etching parts of the first sensing patterns, the connecting unit, and the second sensing patterns under the organic insulating layer is a wet etching process.

11. The method of claim 5, wherein etching parts of the organic insulating layer to expose a portion of a surface of the second sensing patterns is a dry etching process.

12. The method of claim 5, wherein the conductive layer is formed of one selected from the group consisting of Mo, Ag, Ti, Al, Cu, and indium tin oxide.

* * * * *